United States Patent
Hayakawa et al.

(10) Patent No.: US 9,928,940 B2
(45) Date of Patent: Mar. 27, 2018

(54) CABLE AND HARNESS

(71) Applicant: Hitachi Metals, Ltd., Tokyo (JP)

(72) Inventors: Yoshikazu Hayakawa, Hitachi (JP); Tomoyuki Murayama, Hitachi (JP); Fumihito Oka, Hitachi (JP); Hirotaka Eshima, Hitachi (JP); Takahiro Futatsumori, Mito (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/431,217

(22) Filed: Feb. 13, 2017

(65) Prior Publication Data

US 2017/0236617 A1 Aug. 17, 2017

(30) Foreign Application Priority Data

Feb. 16, 2016 (JP) .................. 2016-026720

(51) Int. Cl.
| | |
|---|---|
| *H01B 7/00* | (2006.01) |
| *H01B 7/02* | (2006.01) |
| *H01B 7/282* | (2006.01) |
| *B60R 16/02* | (2006.01) |
| *B60T 1/06* | (2006.01) |
| *B60T 13/74* | (2006.01) |

(52) U.S. Cl.
CPC .......... *H01B 7/0045* (2013.01); *B60T 13/741* (2013.01); *H01B 7/0216* (2013.01); *H01B 7/0241* (2013.01); *H01B 7/2825* (2013.01); *B60R 16/0215* (2013.01); *B60T 1/065* (2013.01); *B60T 13/74* (2013.01)

(58) Field of Classification Search
CPC .. H01B 7/0045; H01B 7/0216; H01B 7/0241; H01B 7/2825; H01B 11/02; B60R 16/0215; B60R 16/0207; B60T 1/065; B60T 13/74
USPC ........ 174/70 C, 70 R, 135, 72 A, 73.1, 74 R, 174/96, 137 R, 138 R, 68.1, 68.3; 248/68.1, 49
See application file for complete search history.

(56) References Cited

U.S. PATENT DOCUMENTS

| | | | | |
|---|---|---|---|---|
| 4,150,249 A | * | 4/1979 | Pedersen | H01B 3/441 174/121 A |
| 4,151,366 A | * | 4/1979 | Betts | H01B 7/295 174/121 A |
| 4,595,793 A | * | 6/1986 | Arroyo | G02B 6/4436 174/121 A |
| 4,687,294 A | * | 8/1987 | Angeles | G02B 6/443 174/121 A |
| 4,781,433 A | * | 11/1988 | Arroyo | G02B 6/4403 264/1.28 |

(Continued)

FOREIGN PATENT DOCUMENTS

JP 2014-220043 A 11/2014

*Primary Examiner* — Angel R Estrada
(74) *Attorney, Agent, or Firm* — Roberts Mlotkowski Safran Cole & Calderon P.C.

(57) ABSTRACT

A cable includes a plurality of electric wires, a tape member wound around the plurality of electric wires, and a jacket that covers an outer periphery of the tape member and includes an urethane-based resin. The tape member includes a nonwoven fabric including one of a polyester, a polypropylene, an aramid fiber, a nylon, an acrylic fiber and a glass fiber. An air permeability of the nonwoven fabric is not less than 30 cc/cm²/sec.

21 Claims, 5 Drawing Sheets

(56) References Cited

U.S. PATENT DOCUMENTS

| | | | | |
|---|---|---|---|---|
| 5,310,964 A * | 5/1994 | Roberts | ............... | G02B 6/4416 174/121 A |
| 5,343,549 A * | 8/1994 | Nave | ................... | G02B 6/4436 385/103 |
| 6,747,214 B2 * | 6/2004 | Goeblmaier | ......... | H01B 7/0258 174/110 R |
| 7,247,797 B2 * | 7/2007 | Buthe | ................... | H01B 7/295 174/110 R |
| 7,534,962 B2 * | 5/2009 | Scheel | .................. | H01B 3/427 174/110 R |
| 7,964,797 B2 * | 6/2011 | Clark | .................... | H01B 7/184 174/110 R |
| 8,455,080 B2 * | 6/2013 | Baer | ........................ | B32B 5/26 428/189 |
| 8,530,745 B2 * | 9/2013 | Eshima | ................. | H01B 7/228 174/108 |
| 2014/0326480 A1 | 11/2014 | Hashimoto et al. | | |

* cited by examiner

CABLE AND HARNESS

The present application is based on Japanese patent application No. 2016-026720 filed on Feb. 16, 2016, the entire contents of which are incorporated herein by reference.

BACKGROUND OF THE INVENTION

1. Field of the Invention

The invention relates to a cable and a harness using the cable.

2. Description of the Related Art

A cable is known which is provided with a sheath around plural electric wires. In the cable, a lubricant such as talc powder is applied around the plural electric wires so as to easily separate the electric wires from the sheath. However, a problem may arise that the lubricant is scattered around during cable termination work etc., causing a decrease in workability.

To solve the problem, a cable has been proposed which is provided with a tape member spirally wound around the electric wires and a sheath on the periphery of the tape member (see, e.g., JP-A-2014-220043).

Due to the tape member around the electric wires, it is easy to separate the electric wires from the sheath without any lubricant put on the electric wires.

SUMMARY OF THE INVENTION

The present inventors noted that, if a sheath of a urethane-based resin is formed on the periphery of the tape member, a problem may arise that the resin is subjected to foaming so as to have voids in the sheath.

As the result of considering the problem, the present inventors found, as one reason for the problem, that when the tape member absorbing moisture from the air is covered with the urethane-based resin sheath by extrusion etc., the water is evaporated by heat during the extrusion so as to cause the voids to be formed in the sheath.

It is an object of the invention to provide a cable that prevents the formation of voids in the urethane-based resin sheath as well as a harness using the cable.

According to an embodiment of the invention, a cable comprises:

a plurality of electric wires;

a tape member wound around the plurality of electric wires; and a jacket that covers an outer periphery of the tape member and comprises an urethane-based resin, wherein the tape member comprises a nonwoven fabric comprising one of a polyester, a polypropylene, an aramid fiber, a nylon, an acrylic fiber and a glass fiber, and wherein an air permeability of the nonwoven fabric is not less than 30 cc/cm$^2$/sec.

According to another embodiment of the invention, a harness comprises:

the above cable; and a connector attached to an end portion of the electric wires.

Effect of the Invention

According to embodiment of the invention, a cable can be provided that prevents the formation of voids in the urethane-based resin sheath as well as a harness using the cable.

BRIEF DESCRIPTION OF THE DRAWINGS

Next, the present invention will be explained in more detail in conjunction with appended drawings, wherein:

FIGS. 2A and 2B are diagrams illustrating the cable in the embodiment of the invention, wherein FIG. 2A is a transverse cross sectional view and FIG. 2B is a broken sectional view in which a jacket and a tape member are shown as a cross section;

DETAILED DESCRIPTION OF THE PREFERRED EMBODIMENTS

Embodiment

An embodiment of the invention will be described below in conjunction with the appended drawings.

Description of a Vehicle for which a Cable is Used

Figure 1:
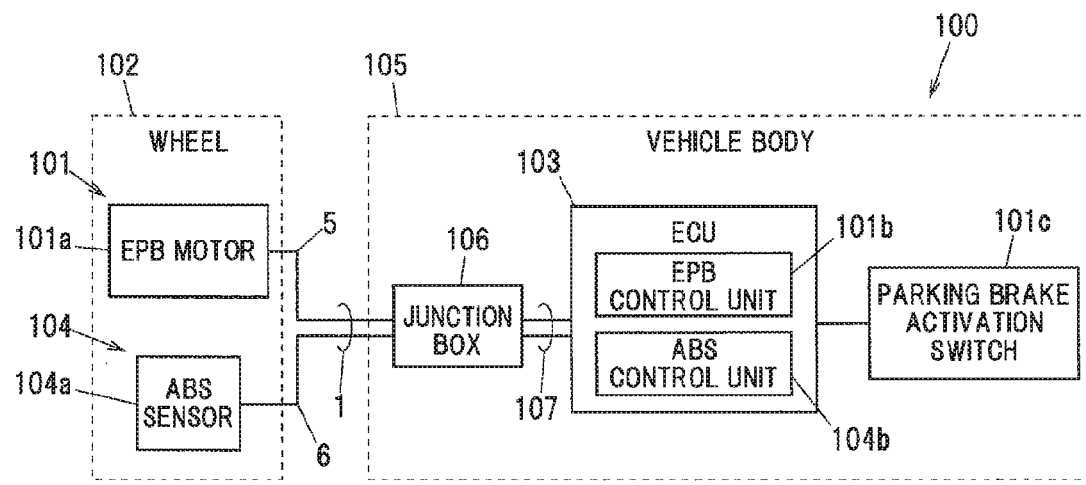
FIG. 1 is a block diagram illustrating a configuration of a vehicle in which a cable in an embodiment of the present invention is used.

FIG. 1 is a block diagram illustrating a configuration of a vehicle in which a cable in the present embodiment is used.

As shown in FIG. 1, a vehicle 100 is provided with an electric parking brake (hereinafter, referred to as "EPB") 101 as an electrically operated brake unit.

The EPB 101 is provided with an EPB motor 101a and an EPB control unit 101b.

The EPB motor 101a is a wheel-side device mounted on a wheel 102 of the vehicle 100. The EPB control unit 101b is mounted on an ECU (electronic control unit) 103 which is a vehicle body-side device of the vehicle 100. Alternatively, the control unit 101b may be mounted on a control unit other than the ECU 103, or may be mounted on a dedicated hardware unit.

The EPB motor 101a is provided with a piston to which brake pads are attached even though it is not illustrated, and it is configured that the piston moved by rotary drive of the EPB motor 101a presses the brake pads against a disc rotor of a wheel (the wheel 102) to generate a braking force. A pair of first electric wires 5 as power lines is connected to the EPB motor 101a to supply a drive current to the EPB motor 101a.

The EPB control unit 101b is configured to output a drive current to the EPB motor 101a for a predetermined period of time (e.g., for 1 second) when a parking brake activation switch 101c is turned from an OFF state to an ON state when stopping the vehicle 100, so that the brake pads are pressed against the disc rotor of the wheel 102 and a braking force to be applied to the wheel 102 is generated. The EPB control unit 101b is also configured to output a drive current to the EPB motor 101a when the parking brake activation switch 101c is turned from the ON state to the OFF state or when an accelerator pedal is depressed, so that the brake pads move away from the disc rotor of the wheel and the braking force on the wheel 102 is released. In other words, it is configured that an operating state of the EPB 101 is maintained from when the parking brake activation switch 101c is turned on to when the parking brake activation switch 101c is turned off or to when the accelerator pedal is depressed. The parking brake activation switch 101c may be a switch of either a lever-type or pedal-type.

An ABS device 104 is also mounted on the vehicle 100. The ABS device 104 is provided with an ABS sensor 104a and an ABS control unit 104b.

The ABS sensor 104a is a rotational speed sensor mounted on the wheel 102 to detect a rotation speed of the wheel 102 during motion of the vehicle. The ABS control unit 104b is mounted on the ECU 103 to control a brake unit based on an output of the ABS sensor 104a to adjust a braking force applied to the wheel 102 so that the wheel 102 is not locked when suddenly stopped. A pair of second electric wires 6 as signal lines is connected to the ABS sensor 104a.

Figure 2A:
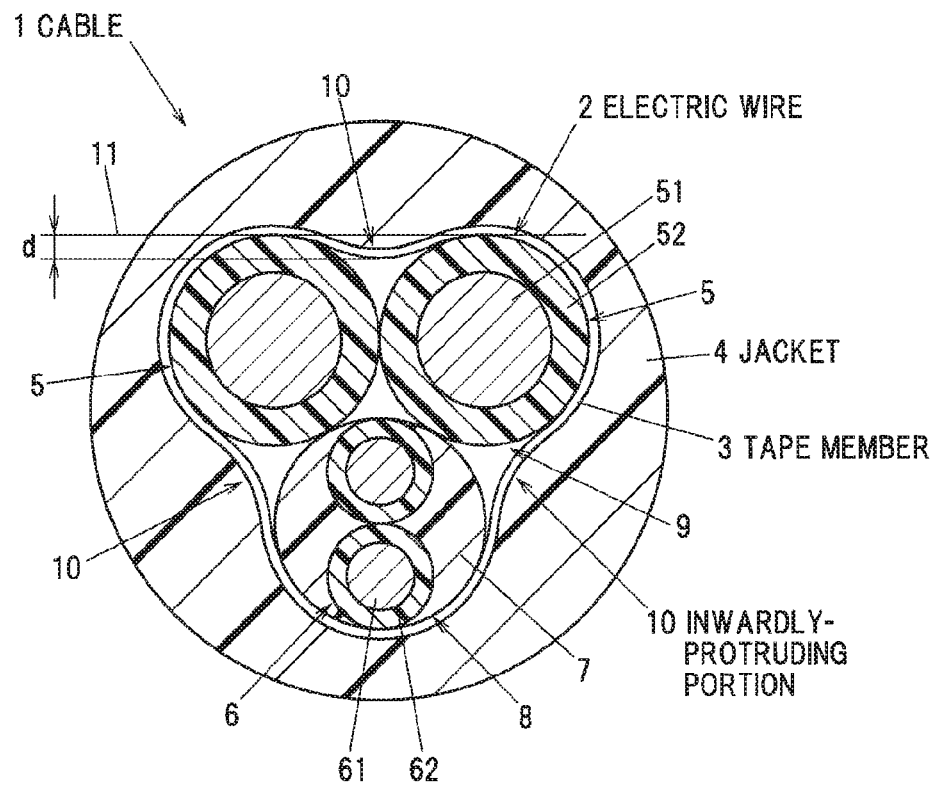
Figure 2B:
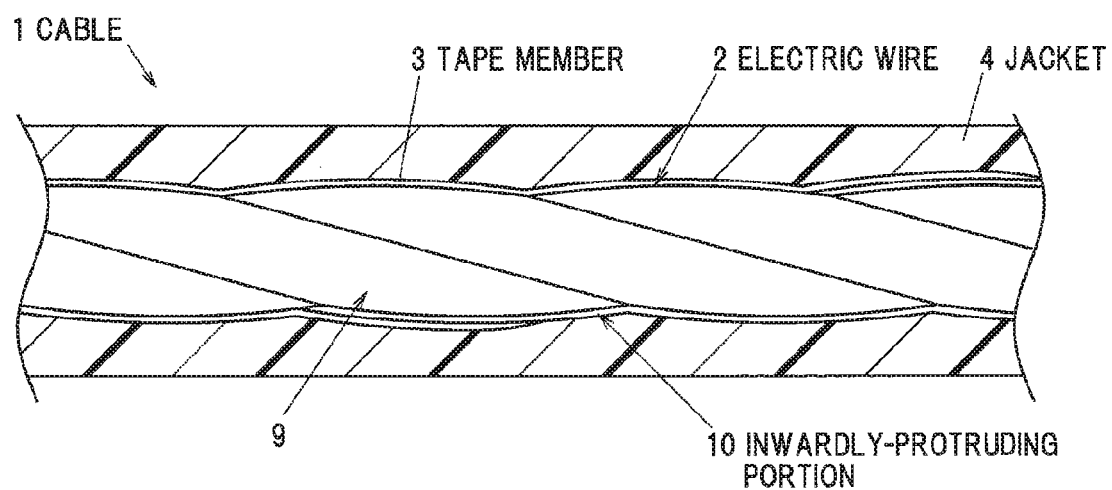

A cable 1 in the present embodiment is obtained by covering the first electric wires 5 and the second electric wires 6 with one jacket 4 (see FIG. 2A). The cable 1 extending out of the wheel 102 side is connected to a wire group 107 inside a junction box 106 provided on a vehicle body 105 and is then connected to the ECU 103 and a battery (not shown) via the wire group 107.

Although only one wheel 102 is shown in FIG. 1 to simplify the drawing, the EPB motor 101a and the ABS sensor 104a may be mounted on each of the wheels 102 of the vehicle 100, or may be mounted on, e.g., only front wheels or only rear wheels of the vehicle 100.

Description of the Cable 1

FIG. 2A is a transverse cross sectional view showing the cable 1 in the present embodiment.

As shown in FIG. 2A, the cable 1 is provided with plural electric wires 2, a tape member 3 formed of a nonwoven fabric and wound around the plural electric wires 2, and a jacket 4 formed of a urethane-based resin and provided to cover the outer surface of the tape member 3.

In the cable 1, the plural electric wires 2 are twisted around each other, and the tape member 3 is spirally wound around the plural electric wires 2.

In the present embodiment, the plural electric wires 2 include a pair of first electric wires 5 provided as power lines for supplying a drive current to the motor 101a for the EPB 101 mounted on the wheel 102 of the vehicle 100.

In the present embodiment, the plural electric wires 2 also include a multicore wire 8 in which a pair of second electric wires 6 as signal lines for the ABS sensor 104a mounted on the wheel 102 are covered with one inner sheath 7.

Although the cable 1 in the present embodiment has three electric wires 2 in total (two first electric wires 5 and one multicore wire 8), the number of the electric wires 2 is not limited thereto. When, for example, many electric wires 2 are provided, the cable may have a multi-layer twisted structure in which an inner layer portion is formed by twisting plural electric wires 2 and an outer layer portion is formed by spirally winding other electric wires 2 around the inner layer portion.

The first electric wire 5 is formed by covering a first conductor 51 with a first insulation 52. The first conductor 51 is formed by twisting highly conductive strands of copper, etc., and the first insulation 52 is formed of an insulating resin such as cross-linked polyethylene.

Strands having a diameter of not less than 0.05 mm and not more than 0.30 mm can be used to form the first conductor 51. When using strands having a diameter of less than 0.05 mm, sufficient mechanical strength may not be obtained, causing a decrease in flex resistance. When using strands having a diameter of more than 0.30 mm, flexibility of the cable 1 may decrease.

The outer diameter of the first conductor 51 and the thickness of the first insulation 52 of the first electric wire 5 are appropriately adjusted according to magnitude of required drive current. In the present embodiment, considering that the first electric wire 5 is a power line for supplying a drive current to the motor 101a for the EPB 101, the outer diameter of the first conductor 51 is set to not less than 1.5 mm and not more than 3.0 mm and the outer diameter of the first electric wire 5 is set to not less than 2.0 mm and not more than 4.0 mm.

The second electric wire 6 is an insulated wire in which a second conductor 61 formed by twisting highly conductive strands of copper, etc., is covered with a second insulation 62 formed of an insulating resin such as cross-linked polyethylene. Strands having a diameter of not less than 0.05 mm and not more than 0.30 mm can be used to form the second conductor 61, in the same manner as the first conductor 51.

The pair of second electric wires 6 in a twisted state and in contact with each other are covered with one inner sheath 7. The multicore wire 8 is formed by covering the pair of second electric wires 6 with one inner sheath 7. The inner sheath 7 is formed of, e.g., a urethane resin. Although the multicore wire 8 having two cores will be described in the present embodiment, the number of cores in the multicore wire 8 is not limited thereto. Also, the plural electric wires 2 may include plural multicore wires 8.

The outer diameter of the second electric wire 6 is smaller than that of the first electric wire 5. In the present embodiment, a pair of first electric wires 5 and the multicore wire 8 formed by covering two second electric wires 6 with one inner sheath 7 are twisted together. Therefore, from the viewpoint of making the outer diameter of the cable 1 close to a circular shape, it is desirable to use the second electric wire 6 which is about half the outer diameter of the first electric wire 5. In detail, it is possible to use the second electric wire 6 which has an outer diameter of not less than 1.0 mm and not more than 1.8 mm and is formed using the second conductor 61 having an outer diameter of not less than 0.4 mm and not more than 1.0 mm.

In the cable 1, two first electric wires 5 and one multicore wire 8 are twisted together and the tape member 3 is spirally wound therearound. The two first electric wires 5 and the one multicore wire 8 are twisted in contact with each other. A portion of the one multicore wire 8 is located in an inner triangle boundary area formed between the two first electric wires 5.

In the EPB 101, a drive current is supplied to the motor 101a basically when the vehicle is stationary. On the other hand, the ABS sensor 104a is used when the vehicle is in motion, and the ABS sensor 104a is not used during when the drive current is supplied through the first electric wires 5. Therefore, in the present embodiment, a shield conductor around the multicore wire 8 is omitted. Omitting the shield conductor allows the cable 1 to have a smaller diameter than when providing the shield conductor and also reduces the number of components, thereby reducing the cost.

Meanwhile, although the first electric wire 5 for supplying a drive current to the EPB motor 101a is described here, the first electric wire 5 may be used to supply a drive current to, e.g., an electric motor of an electro-mechanical brake (hereinafter, referred as EMB) provided on the wheel 102. In this case, since electric current flows in the first electric wires 5 also during motion of the vehicle 100, it is desirable to provide a shield conductor around the multicore wire 8 or around the pair of first electric wires 5 to prevent malfunction of the ABS device 104 due to noise. Alternatively, the pair of first electric wires 5 may be shielded wires each of which has a shield conductor on the outer side of the conductor.

Furthermore, although the second electric wire 6 as a signal line for the ABS sensor 104a is described here, the second electric wire 6 may be a signal line used for another sensor provided on the wheel 102, e.g., for a temperature sensor or an air pressure sensor for detecting air pressure of a tire, etc., or may be a damper wire used to control a damping device of the vehicle 100, or moreover, may be a signal line for controlling the EMB (e.g., a CAN cable, etc.). Even when the first electric wire 5 is used to supply a drive current to the EPB motor 101a, it is desirable to provide a shield conductor around the multicore wire 8 in case of using the second electric wires 6 during the stationary state of the vehicle 100 to prevent malfunction due to noise.

The outer diameter of an assembled article 9, which is formed by twisting three electric wires 2 (two first electric wires 5 and one multicore wire 8) together, is, e.g., about 5 mm to 9 mm. A twist pitch of the electric wires 2 in the assembled article 9 is set by taking into account the outer diameter of the assembled article 9 so that an unnecessary load is not applied to the electric wires 2. The twist pitch of the electric wires 2 in the assembled article 9 here is about 50 mm, but the twist pitch of the electric wires 2 is not limited thereto. The twist pitch of the electric wires 2 is a distance along a longitudinal direction of the assembled article 9 at which a given electric wire 2 (the first electric wire 5 or the multicore wire 8) is located at the same position in a circumferential direction of the assembled article 9.

The tape member 3 is spirally wound around the assembled article 9 and is in contact with all electric wires (the pair of first electric wires 5 and the multicore wire 8) which are covered with the tape member 3. The tape member 3 is interposed between the assembled article 9 and the jacket 4 and serves to reduce friction between the electric wires 2 and the jacket 4 when being bent and to make the electric wires 2 separate easily from the jacket 4 at the time of termination. That is, providing the tape member 3 can reduce friction between the electric wires 2 and the jacket 4 without using a lubricant such as talc powder unlike the conventional cable and reduces stress applied to the electric wires 2 when being bent, and it is thereby possible to improve flex durability as well as workability at the time of termination.

The tape member 3 is desirably slidable (desirably has a low friction coefficient) with respect to the first insulation 52 of the first electric wire 5 and the inner sheath 7. In more detail, a material of the tape member 3 is selected so that the friction coefficient (coefficient of static friction) between the tape member 3 and the first insulation 52/the inner sheath 7 is lower than the friction coefficient (coefficient of static friction) between the jacket 4 and the first insulation 52/the inner sheath 7 without interposition of the tape member 3. The tape member 3 formed of a nonwoven fabric is used in the present embodiment. The details of the nonwoven fabric used to form the tape member 3 will be described later.

The tape member 3 is spirally wound around the assembled article 9 so as to overlap at a portion in a width direction (a direction perpendicular to the longitudinal direction and thickness direction of the tape member 3). The overlap width of the tape member 3 is, e.g., not less than ¼ and not more than ½ of the width of the tape member 3. In the present embodiment, the overlapping portion of the tape member 3 is not adhered by an adhesive, etc.

The width of the tape member 3 is determined so that creases are not formed on the tape member 3 when the tape member 3 is wound, and it is desirable that the width of the tape member 3 to be used be decreased with a decrease in the outer diameter of the entire assembled article 9. In detail, when the outer diameter of the entire assembled article 9 is 5 mm to 9 mm, the width of the tape member 3 is about 20 mm to 50 mm.

A winding pitch of the tape member 3, i.e., a distance along a longitudinal direction at which the tape member 3 is located at the same circumferential position (e.g., a distance between the widthwise edges), can be adjusted by changing the width of the tape member 3 and the overlap width thereof. However, if the width of the tape member 3 is increased and the winding pitch is also increased, the tape member 3 becomes close to the longitudinally wrapped state, resulting in that the cable 1 has less flexibility and is less likely to be bent. Therefore, the winding pitch of the tape member 3 is desirably not more than 50 mm.

The urethane-based resin jacket 4 is provided around the tape member 3. Although a shield conductor is omitted in the present embodiment since the first electric wires 5 are used to supply a drive current to the EPB motor 101a and the drive current flows in the first electric wires 5 in a relatively short time, a shield conductor may be provided between the tape member 3 and the jacket 4 or around the jacket 4 depending on the intended use, etc., of the first electric wires 5.

The tape member 3 of the cable 1 in the present embodiment is formed of a nonwoven fabric of polyester, polypropylene, aramid fiber, nylon, acrylic fiber or glass fiber.

Since the tape member 3 is formed of a nonwoven fabric of polyester, polypropylene, aramid fiber, nylon, acrylic fiber or glass fiber, the tape member 3 is less likely to absorb moisture. Therefore, it is possible to prevent a phenomenon in which water evaporates from the tape member 3 due to heat during when applying the jacket 4 and causes foaming of the jacket 4.

In the present embodiment, the nonwoven fabric used to form the tape member 3 has an air permeability of not less than 30 $cc/cm^2/sec$. This is because when the air permeability is less than 30 $cc/cm^2/sec$, the air containing water vapor is likely to be trapped in a space covered with the tape member 3, and the trapped air is blown out all at once through open spaces of the nonwoven fabric or the overlapping portions of the tape member 3 due to heat during when applying the jacket 4 and may cause foaming of the jacket 4. The air permeability here can be measured by the Frazier method in accordance with JIS L 1913.

Also, the air permeability of the nonwoven fabric used to form the tape member 3 is desirably not more than 200 $cc/cm^2/sec$. This is because if the air permeability is more than 200 $cc/cm^2/sec$, the jacket 4 may partially penetrate through the tape member 3 and reach the electric wires 2 during when applying the jacket 4 and adhere the electric wires 2, causing a decrease in workability at the time of termination.

In other words, the tape member 3 is formed of a nonwoven fabric having an air permeability of not less than 30 $cc/cm^2/sec$ and not more than 200 $cc/cm^2/sec$. To further prevent foaming of the jacket 4 caused by the air trapped in the nonwoven fabric and to prevent adhesion between the electric wires 2 and the jacket 4, it is more preferable that the tape member 3 be formed of a nonwoven fabric having an air permeability of not less than 40 $cc/cm^2/sec$ and not more than 100 $cc/cm^2/sec$.

Meanwhile, the thickness of the nonwoven fabric used to form the tape member 3 is desirably not less than 0.03 mm and not more than 0.10 mm. This is because when the thickness of the nonwoven fabric is less than 0.03 mm, the jacket 4 may partially penetrate through the tape member 3 and reach the electric wires 2 during when applying the jacket 4, causing a decrease in workability at the time of termination. On the other hand, when the thickness of the nonwoven fabric is more than 0.10 mm, flexibility of the cable 1 may decrease due to an increase in rigidity of the tape member 3 and the air permeability may also decrease.

In the present embodiment, a 0.07 mm-thick polyester nonwoven fabric having an air permeability of 67 cc/cm$^2$/sec is used to form the tape member 3.

Furthermore, in the cable 1 of the present embodiment, the tape member 3 and the jacket 4 have inwardly-protruding portions 10 each of which is spirally formed along a cable longitudinal direction so as to protrude inward beyond a common tangent line for two outermost circumferentially-adjacent electric wires 2 and so as to get into a triangle boundary area formed between the two adjacent electric wires 2. In FIG. 2A, the common tangent line for two first electric wires 5 is indicated by a reference numeral 11. Regarding the common tangent line for two adjacent electric wires 2 in case that not less than three electric wires 2 are used, there are such tangents on the inner and outer sides of the cable 1. The term "common tangent line" here is a tangent line which is located on the outer side of the cable 1.

In other words, in the present embodiment, the tape member 3 and the jacket 4 get into each triangle boundary area formed outward between adjacent electric wires 2. As a result, hollow portions formed around the electric wires 2 are reduced in size and buckling is less likely to occur even when the cable 1 is bent or twisted. In addition, since the tape member 3 gets in the triangle boundary areas between the electric wires 2 and is restricted from moving radially outward by the jacket 4, the tape member 3 is less likely to move in the cable longitudinal direction.

If the inwardly-protruding length of the inwardly-protruding portion 10 is small, a buckling prevention effect and an effect of preventing the movement of the tape member 3 may not be sufficiently obtained. Therefore, the inwardly-protruding length of the inwardly-protruding portion 10, i.e., a distance d between the common tangent line 11 for the adjacent electric wires 2 and a top portion of the inwardly-protruding portion 10 is desirably not less than 3%, preferably not less than 10% of the outer diameter of the thickest electric wire 2 (the first electric wire 5 in this example) among the plural electric wires 2.

When the outer diameter of the first electric wire 5 is, e.g., 3 mm, the distance d is desirably at least not less than 0.1 mm. To obtain an effect from having the inwardly-protruding portions 10, the desirable distance d is at least not less than 0.1 mm, preferably not less than 0.3 mm although it depends on the outer diameter of the electric wires 2 to be used. The distance d does not need to be the fixed distance and has some tolerance.

Meanwhile, when the protruding length of the inwardly-protruding portion 10 is too large, workability at the time of termination (e.g., stripping work to remove the jacket 4) may decrease. Therefore, the distance d is desirably not more than 40%, preferably not more than 35% of the outer diameter of the thickest electric wire 2 (the first electric wire 5 in this example) among the plural electric wires 2. The distance d is desirably not more than 1 mm in view of easy removal of the jacket 4 although it depends on the outer diameter of the electric wires 2 to be used.

When the twist direction of the plural electric wires 2 is different from the winding direction of the tape member 3, the tape member 3 is less likely to get in the triangle boundary area between the adjacent electric wires 2. Therefore, the twist direction of the plural electric wires 2 is desirably the same direction as the winding direction of the tape member 3. In this case, when the tape member 3 is wound around the assembled article 9 while applying an appropriate tensile force, the tape member 3 can easily get into the triangle boundary area between the adjacent electric wires 2. After the jacket 4 is applied around the tape member 3 by extrusion coating, the inwardly-protruding portions 10 are formed.

The twist direction of the electric wires 2 here is a direction that the electric wires 2 rotate from the base end toward the front end when the cable 1 is viewed from the front end side (on the side where the tape member 3 overlaps upon itself). Likewise, the winding direction of the tape member 3 is a direction that the tape member 3 rotates from the base end toward the front end when the cable 1 is viewed from the front end side (on the side where the tape member 3 overlaps upon itself).

Since the twist direction of the electric wires 2 and the winding direction of the tape member 3 are the same direction, the twist of the electric wires 2 spontaneously unravels by unwinding the tape member 3 when terminating the cable and it is easy to unravel the electric wires 2. This improves disassemblability of the cable 1 and thereby improves cable termination workability.

In addition, since the twist direction of the electric wires 2 and the winding direction of the tape member 3 are the same direction, the electric wires 2 and the tape member 3 are loosened or tightened synchronously when the cable 1 is distorted. This disperses a load caused by distortion and prevents an excess load from being applied to a certain portion of the cable 1, thereby improving distortion resistance.

When the twist pitch of the electric wires 2 is reduced, the cable 1 becomes more flexible and is easily bent but distortion resistance decreases due to the reduced looseness of the twist. On the other hand, when the twist pitch of the electric wires 2 is increased, distortion resistance is improved but flexibility decreases. In the present embodiment, since a load is dispersed by synchronously loosening or tightening the electric wires 2 and the tape member 3 when being distorted, it is possible to provide enough distortion resistance even when the twist pitch of the electric wires 2 is reduced to improve flexibility.

The twist pitch of the plural electric wires 2 is desirably the same as the winding pitch of the tape member 3 so that the tape member 3 can get into the triangle boundary area between the adjacent electric wires 2 more easily. In this regard, the term "the twist pitch of the plural electric wires 2 is the same as the winding pitch of the tape member 3" here is not limited to the perfect match between the twist pitch of the plural electric wires 2 and the winding pitch of the tape member 3, and includes a slight difference (within ±10%) between the twist pitch of the plural electric wires 2 and the winding pitch of the tape member 3.

The inwardly-protruding portions 10 are desirably formed throughout the longitudinal direction of the cable 1 but may have some gaps in the middle. In other words, in the cable 1, the inwardly-protruding portions 10 may not be formed at some portions in the longitudinal direction. For example, to improve workability at the time of termination, the cable 1 may be configured that the inwardly-protruding portions 10 are not formed (or the protruding length of the inwardly-protruding portions 10 (the distance d) is reduced) at the end portions (with a predetermined distance from the end) by, e.g., changing the winding pitch of the tape member 3.

Although the inwardly-protruding portion 10 is formed in each of the gaps (the triangle boundary areas) between three electric wires 2 in the present embodiment, it is not limited thereto. The inwardly-protruding portion 10 needs to be formed at least one of the gaps (the triangle boundary areas) between the electric wires 2.

In addition, although both the tape member 3 and the jacket 4 protrude inward beyond the common tangent line 11 in the present embodiment, it is not limited thereto. When using, e.g., a relatively thick tape member 3, only the tape member 3 may protrude inward beyond the common tangent line 11. Even in this case, the jacket 4 needs to protrude inward (needs to be in contact with the outer peripheral surface of the tape member 3) at the inwardly-protruding portions 10.

Description of a Harness Using the Cable 1

Figure 3:
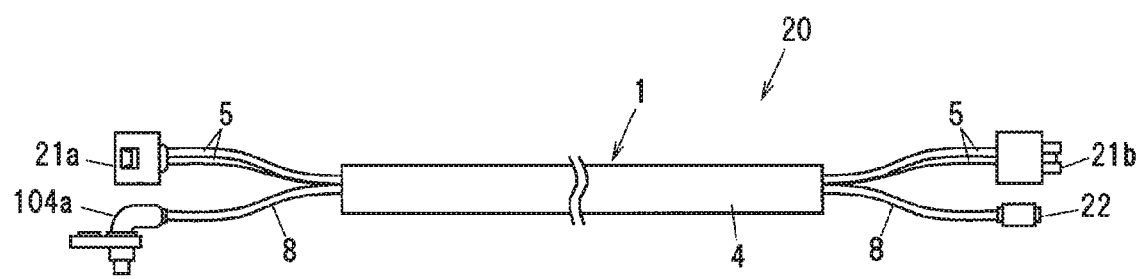
FIG. 3 is a schematic structural diagram illustrating a harness in the embodiment of the invention.

FIG. 3 is a schematic configuration diagram illustrating a harness in the present embodiment.

As shown in FIG. 3, a harness 20 is composed of the cable 1 in the present embodiment and connectors attached to ends portion of the electric wires 2.

In FIG. 3, an end portion on the wheel 102 side is shown on the left side and an end portion on the vehicle body 105 side (the junction box 106 side) is shown on the right side. In the following description, an end of the harness 20 on the wheel 102 side is referred to as "one end" and another end on the vehicle body 105 side (the junction box 106 side) is referred to as "other end".

A wheel-side power connector 21a for connection to the EPB motor 101a is attached to one end of the pair of first electric wires 5 among the electric wires 2, and a vehicle body-side power connector 21b for connection to the wire group 107 inside the junction box 106 is attached to the other end of the pair of first electric wires 5.

The ABS sensor 104a formed by molding a resin and covering the inner sheath 7 is attached to one end of the multicore wire 8 (the pair of second electric wires 6), and a vehicle body-side ABS connector 22 for connection to the wire group 107 inside the junction box 106 is attached to the other end of the multicore wire 8 (the pair of second electric wires 6).

Although separate connectors are provided on the first electric wires 5 and the multicore wire 8 (the second electric wires 6) in this example, one dedicated connector may be provided so that all electric wires 2 are connected together.

Functions and Effects of the Embodiment

As described above, the cable 1 in the present embodiment is configured that the tape member 3 is formed of a nonwoven fabric of polyester, polypropylene, aramid fiber, nylon, acrylic fiber or glass fiber, and the air permeability of the nonwoven fabric is not less than 30 cc/cm$^2$/sec.

Since the tape member 3 is formed of a nonwoven fabric of polyester, polypropylene, aramid fiber, nylon, acrylic fiber or glass fiber, the tape member 3 is less likely to absorb moisture and void formation in the jacket 4 due to the moisture absorbed by the tape member 3 can be prevented.

In addition, by using the nonwoven fabric having an air permeability of not less than 30 cc/cm$^2$/sec to form the tape member 3, void formation in the jacket 4 caused by the air trapped in the space surrounded by the nonwoven fabric can be prevented.

In addition, in the cable 1 of the present embodiment, the tape member 3 and the jacket 4 have the inwardly-protruding portions 10 which are spirally formed along the cable longitudinal direction so as to protrude inward beyond the common tangent line 11 for two outermost circumferentially-adjacent electric wires 2 and to get into triangle boundary areas formed between the adjacent electric wires 2.

Due to the inwardly-protruding portions 10 which get into the triangle boundary areas between the electric wires 2, hollow portions formed around the electric wires 2 can be smaller than when not providing the inwardly-protruding portions 10 and buckling of the cable 1 can be prevented even when the cable 1 is bent or distorted.

In addition, since the inwardly-protruding portions 10 restrict movement of the tape member 3, it is possible to prevent the tape member 3 from moving in the cable longitudinal direction and thus possible to prevent such troubles that the tape member 3 overlaps itself at some portions of the cable 1 and causes a decrease in flexibility.

Modifications

Figure 4:
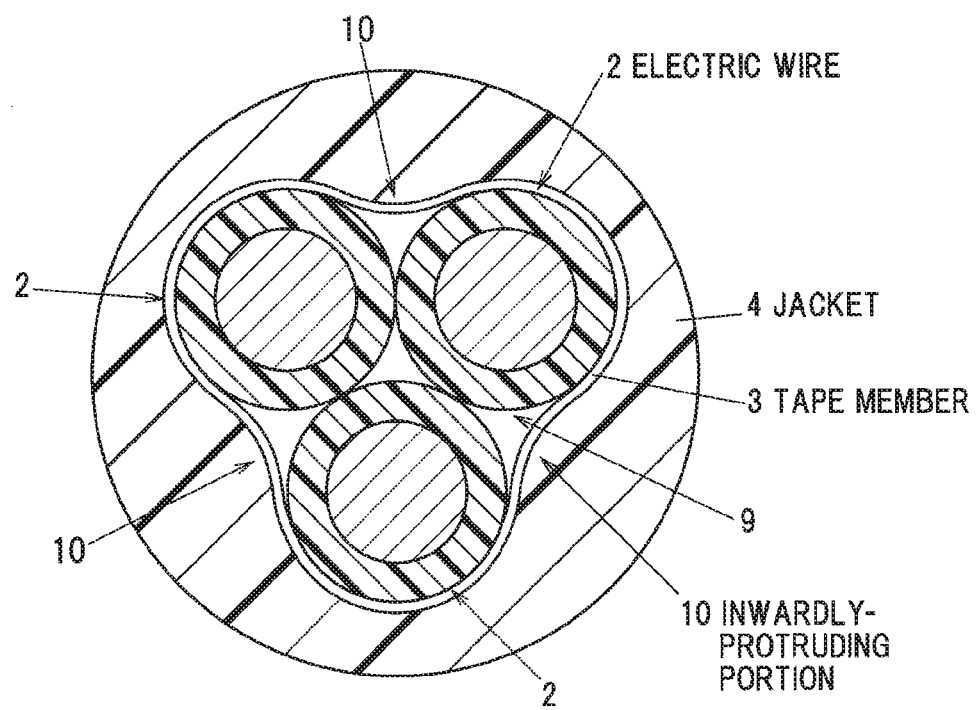
FIG. 4 is a transverse cross sectional view showing a cable in a modification of the invention.
Figure 5:
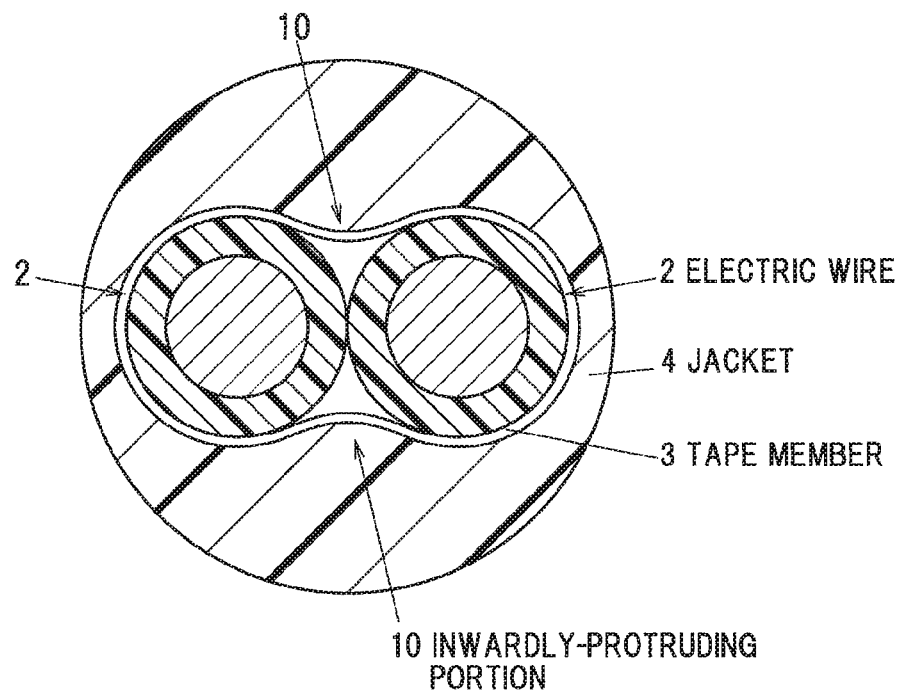
FIG. 5 is a transverse cross sectional view showing a cable in another modification of the invention.

The multicore wire 8 is provided as one of the electric wires 2 in the embodiment but may not be provided as shown in FIGS. 4 and 5. Although FIG. 4 shows a cable using three electric wires 2 and FIG. 5 shows a cable using two electric wires 2, the number of the electric wires 2 may be four or more. In addition, the electric wire 2 does not need to be a power line and may be a signal line.

In addition, the jacket 4 has one layer in the embodiment but may have two or more layers. When providing the jacket 4 having two or more layers by performing extrusion coating for several times, the cross sectional shape of the cable 1 can be more circular and the outer appearance is thereby improved.

In addition, although the cable 1 in the embodiment is used to connect the wheel 102 to the vehicle body 105 in the vehicle 100, the intended use of the cable 1 is not limited thereto. For example, the cable 1 may be used to connect a motor to an inverter in a hybrid car or electric car, or may be used in another application other than vehicle.

In addition, although the tape member 3 is spirally wound around the twisted electric wires 2 in the embodiment, the electric wires 2 may not be twisted and the tape member 3 may be longitudinally wrapped.

In addition, although the tape member 3 and the jacket 4 have the inwardly-protruding portions 10 in the embodiment, the inwardly-protruding portions 10 may be omitted.

Summary of the Embodiments

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A cable (1), comprising: a plurality of electric wires (2); a tape member (3) wound around the plurality of electric wires (2); and a jacket (4) that covers an outer periphery of the tape member (3) and comprises an urethane-based resin, wherein the tape member (3) comprises a nonwoven fabric comprising one of a polyester, a polypropylene, an aramid fiber, a nylon, an acrylic fiber and a glass fiber, and an air permeability of the nonwoven fabric is not less than 30 cc/cm$^2$/sec.

[2] The cable (1) defined by [1], wherein the nonwoven fabric used to form the tape member (3) has a thickness of not less than 0.03 mm and not more than 0.10 mm.

[3] The cable (1) defined by [1] or [2], wherein the plurality of electric wires (2) are twisted with each other, and the tape member (3) is spirally wound around the plurality of electric wires (2).

[4] The cable (1) defined by [3], wherein the tape member (3) and the jacket (4) comprise inwardly-protruding portions (10) each spirally formed along a cable longitudinal direction, wherein the inwardly-protruding portions (10) protrude inward from a common tangent line for two outermost circumferentially-adjacent ones of the electric wires (2) and get into a triangle boundary area formed between the adjacent ones of the electric wires (2).

[5] The cable (1) defined by [3] or [4], wherein a twisting direction of the plurality of electric wires (2) is in a same direction as a winding direction of the tape member (3).

[6] The cable (1) defined by [5], wherein a twisting pitch of the plurality of electric wires (2) is a same as a winding pitch of the tape member (3).

[7] The cable (1) defined by any one of [1] to [6], wherein the plurality of electric wires (2) comprise a power line (5) for supplying a drive current to a motor (101a) for an electric parking brake (101) mounted on a wheel (102) of a vehicle (100).

[8] The cable (1) defined by any one of [1] to [7], wherein the plurality of electric wires (2) comprise a multicore wire (8) that is formed by collectively covering a plurality of insulated wires (6) with an inner sheath (7).

[9] The cable (1) defined by [8], wherein the insulated wires (6) comprise a sensor signal line mounted on a wheel (102) of a vehicle (100).

[10] A harness (20), comprising: the cable (1) defined by any one of [1] to [9], and a connector attached to an end portion of the electric wires (2).

Although the embodiment of the invention has been described, the invention according to claims is not to be limited to the embodiment described above. Further, please note that all combinations of the features described in the embodiment are not necessary to solve the problem of the invention.

The invention can be appropriately modified and implemented without departing from the gist thereof.

What is claimed is:

1. A cable, comprising:
   a plurality of electric wires;
   a tape member wound around the plurality of electric wires; and
   a jacket that covers an outer periphery of the tape member and comprises an urethane-based resin,
   wherein the tape member comprises a nonwoven fabric comprising one of a polyester, a polypropylene, an aramid fiber, a nylon, an acrylic fiber and a glass fiber, and wherein an air permeability of the nonwoven fabric is not less than 30 cc/cm·sup·2/sec.

2. The cable according to claim 1, wherein the nonwoven fabric has a thickness of not less than 0.03 mm and not more than 0.10 mm.

3. The cable according to claim 1, wherein the plurality of electric wires are twisted with each other, and wherein the tape member is spirally wound around the electric wires.

4. The cable according to claim 3, wherein a twisting direction of the electric wires is in a same direction as a winding direction of the tape member.

5. The cable according to claim 4, wherein a twisting pitch of the electric wires is a same as a winding pitch of the tape member.

6. The cable according to claim 1, wherein the plurality of electric wires comprise a power line for supplying a drive current to an electric parking brake motor mounted on a wheel of a vehicle.

7. The cable according to claim 1, wherein the plurality of electric wires comprise a multicore wire that is formed by collectively covering a plurality of insulated wires with an inner sheath.

8. The cable according to claim 7, wherein the insulated wires comprise a sensor signal line mounted on a wheel of a vehicle.

9. A harness, comprising: the cable according to claim 1, and a connector attached to an end portion of the electric wires.

10. The cable according to claim 2, wherein the plurality of electric wires are twisted with each other, and wherein the tape member is spirally wound around the electric wires.

11. The cable according to claim 2, wherein the plurality of electric wires comprise a power line for supplying a drive current to an electric parking brake motor mounted on a wheel of a vehicle.

12. The cable according to claim 3, wherein the plurality of electric wires comprise a power line for supplying a drive current to an electric parking brake motor mounted on a wheel of a vehicle.

13. The cable according to claim 4, wherein the plurality of electric wires comprise a power line for supplying a drive current to an electric parking brake motor mounted on a wheel of a vehicle.

14. The cable according to claim 5, wherein the plurality of electric wires comprise a power line for supplying a drive current to an electric parking brake motor mounted on a wheel of a vehicle.

15. The cable according to claim 2, wherein the plurality of electric wires comprise a multicore wire that is formed by collectively covering a plurality of insulated wires with an inner sheath.

16. The cable according to claim 3, wherein the plurality of electric wires comprise a multicore wire that is formed by collectively covering a plurality of insulated wires with an inner sheath.

17. The cable according to claim 1, wherein the tape member contacts with the jacket.

18. A cable, comprising:
    a plurality of electric wires;
    a tape member wound around the plurality of electric wires; and
    a jacket that covers an outer periphery of the tape member and comprises an urethane-based resin,
    wherein the tape member comprises a nonwoven fabric comprising one of a polyester, a polypropylene, an aramid fiber, a nylon, an acrylic fiber and a glass fiber, and wherein an air permeability of the nonwoven fabric is not less than 30 cc/cm·sup·2/sec,
    wherein the plurality of electric wires are twisted with each other, and wherein the tape member is spirally wound around the electric wires,
    wherein the tape member and the jacket comprise inwardly-protruding portions each spirally formed along a cable longitudinal direction, and
    wherein the inwardly-protruding portions protrude inwardly from a common tangent line of two outermost circumferentially-adjacent ones of the electric wires and get into a triangle boundary area formed between the adjacent ones of the electric wires.

19. The cable according to claim 18, wherein a twisting direction of the electric wires is in a same direction as a winding direction of the tape member.

20. The cable according to claim 18, wherein the plurality of electric wires comprise a power line for supplying a drive current to an electric parking brake motor mounted on a wheel of a vehicle.

21. The cable according to claim 18, wherein the plurality of electric wires comprise a multicore wire that is formed by collectively covering a plurality of insulated wires with an inner sheath.

* * * * *